June 13, 1939. H. H. ALBINSON 2,162,046
AUTOMOBILE STORAGE COMPARTMENT
Filed June 17, 1937 2 Sheets-Sheet 2
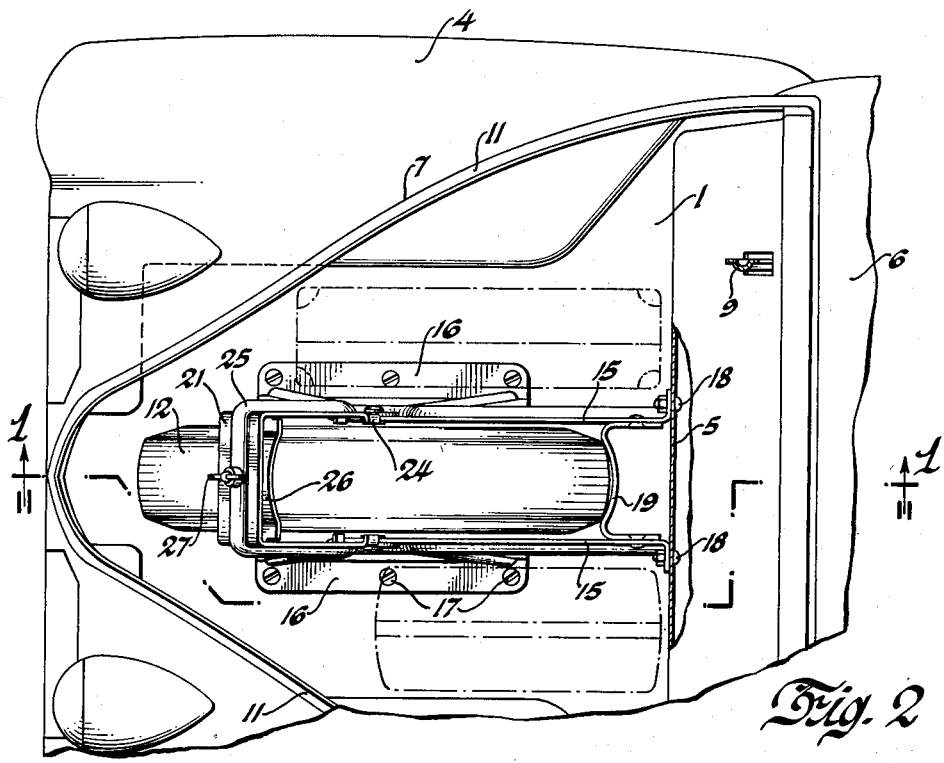
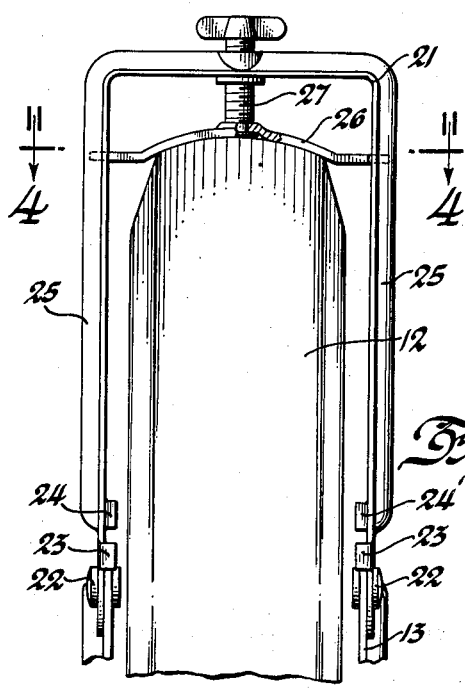
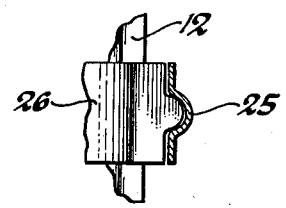
Inventor
Harold H. Albinson Patented June 13, 1939

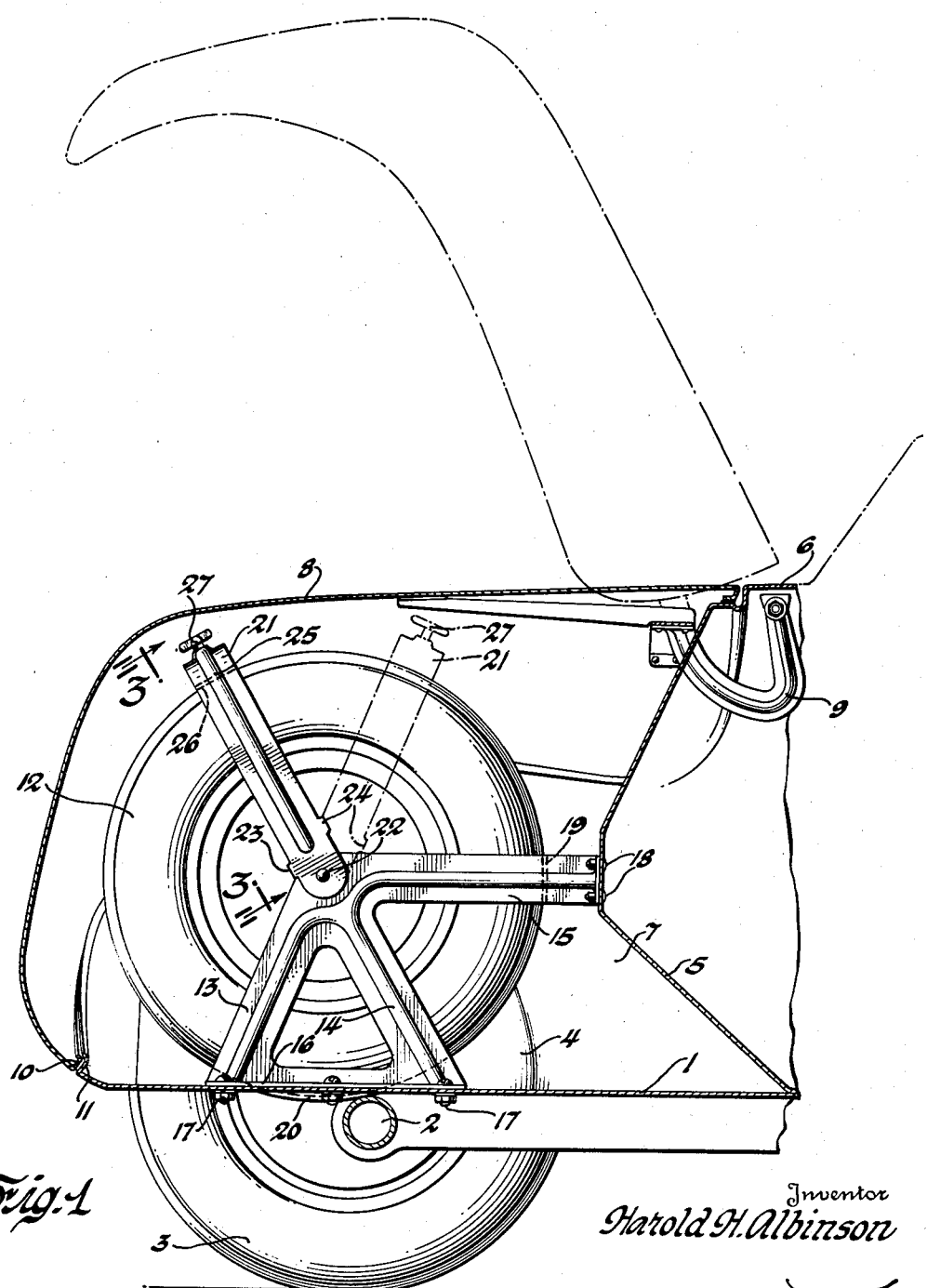

2,162,046

UNITED STATES PATENT OFFICE 2,162,046

AUTOMOBILE STORAGE COMPARTMENT

Harold H. Albinson, Detroit, Mich., assignor to General Motors Corporation, Detroit, Mich., a corporation of Delaware Application June 17, 1937, Serial No. 148,648

1 Claim. (Cl. 224—29)

This invention relates to motor vehicles and more particularly to an improvement in body structures.

An object of the invention is to provide an improved end construction especially suited to that type of automobile in which the main frame and body are an integral unit. More specifically the end construction involved is that at the front of a vehicle having both the power plant and drive axle at the rear.

A further object of the invention is to provide a storage compartment forward of the passenger compartment arranged to make best use of available space for stowing a spare tire, repair tools, luggage and other miscellaneous articles to be carried.

Another object of the invention is to provide on the longitudinal center line of the vehicle a forwardly opening pocket alined with and conveniently accessible through the front opening to the compartment for supporting the spare tire in an upright position.

A further and important object of the invention is to provide diagonal body stiffening braces within the compartment which are utilized in forming the tire receiving pocket and thus increase structural strength of the front end without obstruction to loading space.

Additional objects and advantages of the invention will become apparent during the course of the following specification having reference to the accompanying drawings wherein Figure 1 is a longitudinal vertical section of a vehicle front end embodying the invention and is taken substantially on line 1—1 of Figure 2; Figure 2 is a plan view of the front end with the bonnet removed; Figure 3 is a detail view on an enlarged scale looking in the direction of the arrows on line 3—3 of Figure 1; and Figure 4 is a detail section taken on line 4—4 of Figure 3.

In the drawings the base structure is shown as including a sheet metal panel or floor 1 and a dead axle 2, the ends of which may be independently sprung on steerable wheels 3. The wheels on opposite sides of the vehicle are housed within fenders or pockets 4 and between the fenders the panel 1 affords a loading platform for the storage compartment, the rear of which is defined by a partition or body wall 5 constituting the usual dash and toe board under the cowl panel 6. The compartment tapers in width with the side walls 7 converging forwardly as seen in Figure 2 so that the greatest width is adjacent the wall 5 and the greatest length on the longitudinal center line of the vehicle. The particular shape of the compartment is incidental to appearance design factors and contour of the vehicle as a whole. A hood or bonnet 8 of appropriate shape closes the top and front of the compartment and preferably is hinged along its rear edge through arms 9 pivoted to cowl brackets for swinging movement between the full line and broken line positions seen in Figure 1. Marginal flanges 10 on the movable closure door or bonnet 8 fit corresponding seats 11 on the wall 7 and cowl panel 6 and the use of anti-squeak webbing therebetween will serve to weatherproof the line of jointure.

Medially dividing the compartment on the longitudinal center line of the vehicle is a pocket to receive a spare tire assembly 12 in an upright position directly in line with the forward opening to the compartment. This disposition of the spare tire will be found not to interfere with design contours and it leaves ample room for storing handgrips, suitcases and other baggage within the compartment as indicated by broken lines in Figure 2. For convenience and economy, the tire receiving pocket preferably is formed by a body bracing structure which may be in the nature of a pair of transversely spaced standards or uprights each comprising a series of radial arms 13, 14 and 15, preferably formed as a single stamping or pressing with the arms 13 and 14 extending diagonally upward from the floor toward each other and joined at the bottom through an outturned flange 16 by fastening studs 17 to the platform 1.

The other arm 15 extends rearwardly and is joined by bolts 18 to the partition 5 so that the body wall and platform are braced diagonally through both uprights for imparting longitudinal stiffness to the assembly. Immediately adjacent the wall 5 the arms 15 of the two upright braces or standards are joined by a strap 19 welded or riveted at opposite ends to the arms 15 and this strap affords a seat for the spare tire in circumferentially spaced relation to the floor on which the tire is supported between the standards. To insure proper positioning of the tire on the floor 1 an arcuate depression as at 20 will be helpful.

For closing the forward opening in the tire retaining pocket there is shown in the drawing a U-shaped strap or hoop 21 straddling the tire with its opposite ends pivotally connected by rivet studs 22 or the like to the pair of body braces on an axis at or near the center of the tire. For the purpose of limiting the range of swinging movement of the strap or gate one or both of its legs may be provided with an inturned lug as at 55

23 along one edge for abutment with the forward edge of the arm or leg 13 and a similar abutment lug 24 on the opposite edge of the strap leg is for engagement with the upper edge of the arm or leg 15 when the gate is swung to the open position indicated by broken lines in Figure 1. Both the swinging gate 21 and the several arms of the fixed uprights may be formed with suitable reinforcement formations as, for example, the depression or rib 25 and in the case of the rib formed in the strap 21 this is used as a guide to receive ears or projections on opposite ends of a clamp bar 26 carried by the hand screw 27 threadedly engaged with the bight of the U-shaped strap 21. Through the adjustment of the hand screw 27 the clamp plate 26 is brought into engagement with the tread of the tire in the closed position of the gate and serves to lock the parts in the tire retaining position. Backing off the hand screw will enable the strap to be swung to the open position whereupon the tire may be readily removed and replaced by rolling it through the front opening of the compartment.

I claim:

An end storage compartment construction for motor vehicles, including a dash panel, a body floor panel projecting beyond the dash panel to provide a storage platform, and having a seat for a spare tire, a pair of pressed metal body braces extending in parallel vertical planes normal to the floor and dash panels on opposite sides of said seat to receive a spare tire therebetween, means connecting the opposite ends of the braces at diagonally spaced points to the dash panel and floor panel, respectively, a tire engaging seat connecting the vertically disposed body braces in circumferentially spaced relation to said floor seat and a tire retaining member hinged to said braces to maintain a tire in engagement with both of said seats.

HAROLD H. ALBINSON.